Jan. 7, 1930.
H. C. HAYES
1,742,704
APPARATUS FOR RECEIVING AND DETERMINING
THE DIRECTION OF SUBMARINE SOUNDS
Filed Aug. 12, 1924
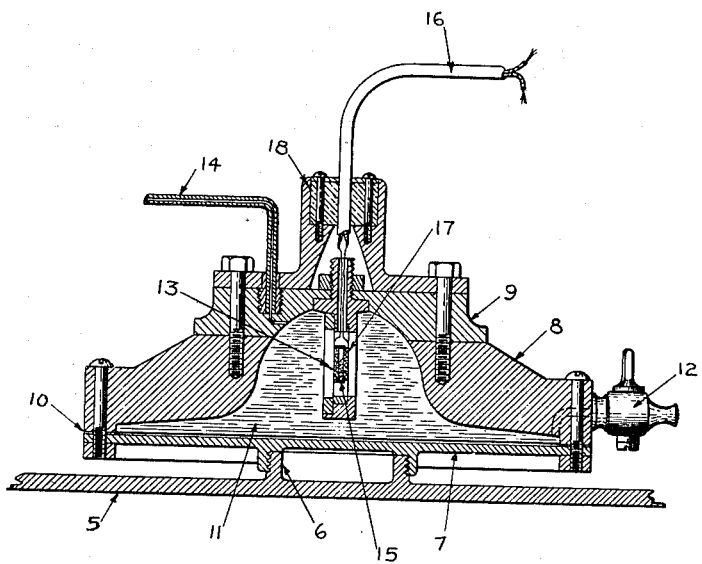
Inventor
HARVEY C. HAYES.
By John J. Fitzgerald
Attorney Patented Jan. 7, 1930

1,742,704

UNITED STATES PATENT OFFICE

HARVEY C. HAYES, OF WASHINGTON, DISTRICT OF COLUMBIA

APPARATUS FOR RECEIVING AND DETERMINING THE DIRECTION OF SUBMARINE SOUNDS

Application filed August 12, 1924. Serial No. 731,579.

(GRANTED UNDER THE ACT OF MARCH 3, 1883, AS AMENDED APRIL 30, 1928; 370 O. G. 757)

My invention relates generally to a means for receiving and determining the direction of submarine sounds, and more particularly to a receiving unit used therein and its installation.

An object of the invention is to provide a receiving unit which will amplify the received sounds.

Another object is to provide a microphone, the diaphragm of which is not affected by local disturbances, such as machinery noises, slapping of waves, and the like.

A further object is to provide a receiver of the "skin type" that is cheaply and quickly installed or repaired on any vessel without the necessity of docking the vessel.

With the above and other objects in view the invention consists in the novel construction, combination and arrangement of parts as will be hereinafter described.

The energy associated with sound waves traversing a highly incompressible medium such as is afforded by a liquid or solid differs from that associated with sound waves in air or any other gaseous medium in that the amplitude of motion is very slight as compared with the pressure difference between the node and loop of a wave. And as a result of this difference submarine sound waves readily penetrate substances that have a high reflection coefficient for sound waves in air. As a result submarine sound waves set the skin of a ship in motion with an amplitude comparable with that of the wave in the water outside of the ship's hull. And since the wave length of submarine sounds of audible pitch is great compared with the thickness of a ship's skin, the sound wave encountering the skin forces it to vibrate back and forth through an amplitude comparable with that of the sound wave.

The very slight motion of the ship's skin introduces only comparatively slight restoring forces and as a result the vibration of the skin would at all points bear a somewhat constant and definite phase relation with the impinging sound waves if the skin were uniform throughout and not loaded or stiffened by ribs, laps, or unequal curvature at different points. Under such conditions the responses from receivers installed directly on the inside of the ship's skin would bear the same phase relations with one another that they would if installed directly outside of the skin and they would serve for determining the direction of submarine sounds by means of the principle of compensation.

But because of the presence of ribs, laps, and unequal curvature the phase relation between the vibration of the ship's skin and the impinging sound waves is not uniform but varies from point to point over the ship's submerged surface. However, there are numerous points where this phase relation will be constant, but of course different than it is at other points. For instance, two symmetrical points on opposite sides of the ship or the midpoint between the ribs on a line parallel with the keel. Moreover, any two points can be made to have the same phase relation with respect to the incoming sound waves by loading the skin at one point or the other with a proper amount of inertia and this treatment can be extended to any number of points where it is desired to mount receivers.

In general, the amplitude of motion of a ship's skin due to comparatively weak sounds is not sufficient to properly energize microphonic receivers but it has been found that this motion can be amplified.

Referring more particularly to the drawing, forming part of this specification and in which the figure is a cross sectional view of a receiving unit constructed and installed in accordance with my invention, 5 indicates a ship's skin or hull, which, at desired points, is provided with lugs 6 which in turn carry a diaphragm 7. In order that the diaphragm may be quickly and easily removed from the lugs, it is desirable that it be screw-threaded thereto, although other means of attachment may be employed. A heavy inertia casting 8, having a removable cover 9, is connected with the diaphragm, as at 10, these three members forming a liquid holding chamber or tank 11 therebetween, the chamber being filled, or drained, through a petcock 12. A capillary tube 14 permits the slow passage of the liquid caused by temperature changes but prevents pressure release of the rapid pressure impulses due to the waves. A microphone 15 of the ordinary inertia type and having two small diaphragms (13) and (17) is suitably mounted within the liquid chamber (11) and has connection with a receiving apparatus (not shown) through electrical leads 16 passing through a water-tight stuffing-box 18.

In operation the submarine sound vibrations impinging on the ship's skin cause it to vibrate to the pitch of the sound. These vibrations of minute amplitude force diaphragm 7 to vibrate at the same frequency and practically the same amplitude. Any displacement of diaphragm 7 causes a magnified displacement of the diaphragms 13 and 17 of the microphone 15, the magnification being equal to the area ratio of diaphragm 7 to the diaphragms of the microphone. This results in making the microphonic action much greater than that given by a microphone attached directly to the skin of a vessel.

The operation of the skin type receiver is quite different from that of a receiver placed in a tank having the ship's skin as one side of the tank. Such an installation uses the portion of the skin enclosing the tank as a diaphragm since the inertia of the rest of the tank is such as to prevent the skin from vibrating across the line of contact between tank and skin. This inertia loading of the skin prevents it from vibrating freely, as it otherwise would and not only makes the amplitude of vibration less but distorts the phase relation between the received sound and the sound waves. Moreover, the design of the skin type receiver is such as to minimize the disturbance from local noises such as machinery noises and the slapping of waves for such sounds traverse the ship's plating for the most part as longitudinal vibrations and while such motion of the skin plates tends to warp the diaphragm 7 they do not tend to change the volume of the liquid chamber and hence do not much affect the diaphragms 13 and 17 of the microphone 15.

It will be understood the above description and accompanying drawing comprehend only the general and preferred embodiment of my invention and that various minor changes in details of construction, proportion and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

Having described my invention, I claim:

1. In combination, a concave member, a vibratable disk carried by said concave member to form an enclosed chamber, a unit for receiving pressure waves mounted in the chamber, said unit including a pair of diaphragms the combined area of which is less than that of the disk and the plane of which is substantially perpendicular to that of the disk, and an incompressible medium filling the space between the unit and the limits of the chamber whereby vibrations of the disk are communicated to the diaphragm in amplified form.

2. In combination in a microphone unit for detecting submarine sound signals, a disc, mounting means upon the disc, an inertia element mounted upon the circumference of the disc and enclosing a chamber between the inertia element and the disc, a microphone having a diaphragm mounted upon the inertia element and within the chamber between the inertia element and the disc, the area of the diaphragm of the microphone being appreciably less than the area of the disc constituting the wall of the chamber, and a liquid filling the chamber.

3. In combination in a microphone unit for detecting submarine sound signals, a disc, mounting means upon the disc, an inertia element mounted upon the circumference of the disc and enclosing a chamber between the inertia element and the disc, a microphone having a plurality of diaphragms and mounted upon the inertia element and within the chamber between the inertia element and the disc, the area of the diaphragms of the microphone being appreciably less than the area of the disc constituting the wall of the chamber, and a liquid filling the chamber.

4. In combination in a microphone unit for detecting submarine sound signals, a disc, mounting means upon the disc, an inertia element mounted upon the circumference of the disc and enclosing a chamber between the inertia element and the disc, a microphone having a plurality of diaphragms mounted upon the inertia element and within the chamber between the inertia element and the disc, the diaphragms positioned approximately perpendicular to the disc, and a liquid filling the chamber about the microphone.

HARVEY C. HAYES.